US008145029B2

(12) United States Patent
Wu et al.

(10) Patent No.: US 8,145,029 B2
(45) Date of Patent: Mar. 27, 2012

(54) APPARATUS AND METHOD FOR INTERLACE SCANNING VIDEO SIGNAL FREQUENCY MULTIPLICATION

(75) Inventors: Chung-Wen Wu, Yilan County (TW); Wen-Hsuan Lin, Taipei County (TW)

(73) Assignee: Novatek Microelectronics Corp., Hsinchu (TW)

( * ) Notice: Subject to any disclaimer, the term of this patent is extended or adjusted under 35 U.S.C. 154(b) by 1595 days.

(21) Appl. No.: 11/308,480

(22) Filed: Mar. 29, 2006

(65) Prior Publication Data

US 2007/0182852 A1 Aug. 9, 2007

(30) Foreign Application Priority Data

Feb. 9, 2006 (TW) .............................. 95104331 A

(51) Int. Cl.
*H04N 5/931* (2006.01)

(52) U.S. Cl. ...................................................... 386/208

(58) Field of Classification Search .................... 386/46, 386/95, 48, 61, 84, 108
See application file for complete search history.

(56) References Cited

U.S. PATENT DOCUMENTS 4,916,541 A * 4/1990 Hashimoto et al. ........... 348/448
5,191,434 A * 3/1993 Kim ................................ 386/84
5,216,504 A * 6/1993 Webb et al. ................... 348/190
5,313,301 A * 5/1994 Lee .............................. 348/607
5,633,687 A * 5/1997 Bhayani et al. ............... 348/441
6,271,809 B1 * 8/2001 Kim ............................... 345/60

* cited by examiner

*Primary Examiner* — William C Vaughn, Jr.
*Assistant Examiner* — Tat Chio
(74) *Attorney, Agent, or Firm* — Jianq Chyun IP Office

(57) ABSTRACT

A method and an apparatus for interlace scanning video signal frequency multiplication are provided. The method includes the following steps: first, removing a part of a first vertical synchronous signal (V-sync signal) which is asynchronous with a first horizontal synchronous signal (H-sync signal); next, capturing a first field and a second field from an interlace scan video signal according to the first V-sync signal obtained in the previous step; performing a frequency multiplication on a frame made up by the first and second fields, and producing a second V-sync signal and a second H-sync signal; finally, compensating for the second V-sync signal on a border between two fields of the frame after the frequency multiplication according to the second H-sync signal. Thereby, the method can be used to perform frequency multiplication using a line buffer instead of a frame buffer, to output through interface scanning without sacrificing image quality.

14 Claims, 9 Drawing Sheets

F
V_Sync
V1
OF
V2
EF
H_Sync
SL
1 2
n n+1
2n 2n+1
scan line of odd field
horzontal scan
vertical scan
0
0
0
0
0
0
100

APPARATUS AND METHOD FOR INTERLACE SCANNING VIDEO SIGNAL FREQUENCY MULTIPLICATION

CROSS-REFERENCE TO RELATED APPLICATION

This application claims the priority benefit of Taiwan application serial no. 95104331, filed on Feb. 9, 2005. All disclosure of the Taiwan application is incorporated herein by reference.

BACKGROUND OF THE INVENTION

1. Field of Invention

The present invention relates to a method and an apparatus for video signal frequency multiplication, and more particularly, to a method and an apparatus for interlace scanning video signal frequency multiplication.

2. Description of Related Art

At present, image and video display devices generally all have frequency multiplication functionality. The so-called "frequency multiplication" means that the scan line for inputting video signal is increased or reduced by a magnitude, where the magnitude is not limited to an integer, and 0.5, or 1.5, etc. are also possible values. Thus, images or video frames can meet the requirements of the resolution of the display device after being processed. Taking the cathode ray tube display as an example, the video signal can be transferred in two ways, i.e., the interlace scan signal and the non-interlace scan signal. Therefore, the architecture of the video processing apparatus can be divided into the interlace scan and the non-interlace scan. If a video processing apparatus with the interlace scan architecture is employed, each of the video frames must include an odd number of scan lines; if a video processing apparatus with the non-interlace scan architecture is employed, each of the video frames must include an even number of scan lines.

FIG. 1A is a timing diagram of the conventional interlace scan. FIGS. 1B, 1C, and 1D are schematic views of the displaying modes for the conventional interlace scan. Referring to FIGS. 1A, 1B, 1C, and 1D together, the timing diagram 100 of the interlace scan includes the vertical synchronous signal (V-sync signal) and the horizontal synchronous signal (H-sync signal). During the period of the first pulse V1 of the V-sync signal, the input video frame F is scanned for the odd number of scan lines O (as shown in FIG. 1B) according to the scan period of the H-sync signal, so that an odd field OF is produced. During the period of the pulse V2 of the second V-sync signal, the input video frame F is similarly scanned for the even number of scan lines E (as shown in FIG. 1C) according to the scan period of the H-sync signal, so that an even field EF is produced.

The odd field OF and the even field EF forms a video frame F of the display device, and the video frame F includes (2n+1) scan lines SL. For example, as for the odd field OF, the electron gun of the display device only scans the odd scan lines O of the video frame F, wherein the odd field O includes (n+0.5) scan lines. As for the even field EF, the electron gun of the display device only scans the even scan lines E of the video frame F, wherein the even field EF also includes (0.5+n) scan lines. Therefore, when the odd field OF is added to the even field EF (as shown in FIG. 1D), (2n+1) scan lines SL will be produced, i.e., the image that will be finally displayed to the user by the display device. The solid arrow in FIGS. 1B, 1C, and 1D shows that the electron gun of the display device is scanning the scan lines SL, and the dashed arrow shows that it draws back.

FIG. 2 is a block diagram of the conventional video processing apparatus of the display device. Referring to FIG. 2, the video processing apparatus 200 includes an analog-to-digital converter (ADC) 201, an input synchronizing processor 203, a capture 205, a buffer 207, a frequency multiplier 209, and an output synchronizing processor 211. The buffer 207 can be a frame buffer for storing one or more frames or a scan line buffer for storing one or more scan lines.

The ADC 201 is used to receive the video signal VS, and to provide the digital signal to the capture 205. The input synchronizing processor 203 is used to receive the first composite synchronous signal H/V_Sync_in, and to provide the first H-sync signal and the first V-sync signal to the capture 205, respectively. According to the first H-sync signal and the first V-sync signal respectively, the capture 205 is used to capture the range for the digital signal to be processed, and send to the buffer 207. The buffer 207 stores the digital data in a unit of frame or scan line. After being processed by the frequency multiplier 209, the digital signal VO is output, and the second H-sync signal and the second V-sync signal are respectively output to the output synchronizing processor 211. The output synchronizing processor 211 provides a second composite synchronous signal H/V_Sync_out according to the second H-sync signal and the second V-sync signal. And finally, the video processing apparatus 200 provides the output digital signal VO and the second composite synchronous signal H/V_Sync_out to a back-end circuit of the display device for further processing.

The above-mentioned first composite synchronous signal H/V_Sync_in is produced by combining the first H-sync signal and the first V-sync signal through modulating. Correspondingly, if the first composite synchronous signal H/V_Sync_in is demodulated, the first H-sync signal and the first V-sync signal will be produced respectively. Similarly, the second composite synchronous signal H/V_Sync_out is also produced by combining the second H-sync signal and the second V-sync signal through modulating. Thus, if the second composite synchronous signal H/V_Sync_out is demodulated, the second H-sync signal and the second V-sync signal will be produced respectively.

FIG. 3A is a schematic view of the conventional frequency multiplication method employing a frame buffer. Referring to FIGS. 1A, 2, and 3A together, the buffer 207 in the video processing apparatus 200 is a frame buffer. Therefore, during the scan period t of the H-sync signal, the buffer 207 temporarily stores the scan lines SL of the odd field OF. Then, when the scan lines SL of the even field EF are received, the scan lines O of the odd field are added to the scan lines E of the even field with video frame F as a storage unit, so as to form a complete image. As such, in the same scan period t of the H-sync signal (H-sync), a frequency-multiplied output can be achieved after the processing of the frequency multiplier 209.

FIG. 3B is a schematic view of the displaying mode for the conventional non-interlace scan employing a frame buffer for frequency multiplication. Conventionally, although a desirable image can be obtained by employing a frame buffer, performing the frequency multiplication with the frequency multiplier, and outputting in a non-interlace scan mode, the cost is considerably high since the frames are stored by the frame buffer.

FIG. 4A is a schematic view of the conventional frequency multiplication method employing a scan line buffer. Referring to FIGS. 1A, 2, and 4A together, the buffer 207 in the video processing apparatus 200 is a scan line buffer. Therefore, during the scan period t of the H-sync signal, the individual scan lines SL of the odd field OF and that of the even field EF stored in the buffer 207 are together processed by the frequency multiplier 209, so that in the same scan period t of the H-sync signal (H-sync), a multiplied-frequency output can be achieved for the individual scan lines SL of the odd field OF and that of the even field EF.

FIG. 4B is a schematic view of the displaying mode for the conventional interlace scan employing a scan line buffer. After being frequency multiplied by the frequency multiplier, the odd field and the even field are output in an interlace scan mode. Each of the odd field and the even field originally include 0.5 scan lines. Due to the frequency multiplication, the number of the scan lines for both the odd field and even field becomes an integer. Thereby, the two fields forming the display image overlap when output by the display device (as shown in FIG. 4B), and the image quality is deteriorated.

In view of the above, in the conventional video frequency multiplication apparatus, the video signal can be transferred in two ways, i.e., the interlace scan signal and the non-interlace scan signal, such that the architectures of the video processing apparatus can be divided into the interlace scan and the non-interlace scan. In addition, the buffers can be categorized as the frame buffer and the scan line buffer. Although a desirable image can be achieved by employing a frame buffer, performing the frequency multiplication with the frequency multiplier, and outputting in a non-interlace scan mode, the cost is considerably high since the frames are stored by the frame buffer. On the other hand, when employing a scan line buffer, performing the frequency multiplication with the frequency multiplier and outputting in an interlace scan mode, the odd and even fields output by the display device are overlapped with each other, thus, the purpose of the interlace scan becomes meaningless; and the image quality is deteriorated.

SUMMARY OF THE INVENTION

In view of the above, the present invention provides a method for interlacing scan video signal frequency multiplication, comprising: performing the frequency multiplication on the interlace scan signal received by the video processing apparatus; and then outputting this as the interlace scan signal. Therefore, not only can the high cost of the conventional frame buffer architecture be avoided, but the disadvantage that the output fields of the conventional scan line buffer architecture overlap with each other can also be eliminated. Meanwhile, the current video processing apparatus for processing the non-interlace scan architecture can be used for processing the interlace scan signal.

The present invention further provides an apparatus for the interlace scan video signal frequency multiplication. Based on the spirits of the present invention as described above, the apparatus applicable for the present invention can also be used to achieve the aforementioned advantages of the present invention.

The method for interlacing scan video signal frequency multiplication provided by the present invention comprises the following steps: removing a part of a first V-sync signal which is asynchronous with a first H-sync signal; according to said first V-sync signal, capturing a first field and a second field from an interlace scan video signal; then, performing a frequency multiplication on a frame made up by the first field and the second field, and producing a second V-sync signal and a second H-sync signal; and finally, according to the second H-sync signal, compensating for the second V-sync signal on a border between two fields of the frame after the frequency multiplication.

In one embodiment of the present invention, the frequency multiplication can be achieved by interpolation calculating or by duplicating the scan lines. The frame before the frequency multiplication includes an odd number of scan lines, and the frame after the frequency multiplication also includes an odd number of scan lines.

In this embodiment, the first field is either an odd field or an even field, and the second field is one of an odd field and an even field that is different from the first field.

In another aspect, the present invention provides an apparatus for the interlace scan video signal frequency multiplication, which includes an input synchronizing processor, a capture, a frequency multiplier, and an output synchronizing processor. The input synchronizing processor is used for removing a part of a first V-sync signal which is asynchronous with a first H-sync signal, and outputting the first V-sync signal. The capture is used for capturing a first field and a second field from an interlace scan video signal according to the first V-sync signal output by the input synchronizing processor and then outputting the first and second fields. The frequency multiplier is used for performing a frequency multiplication on a frame made up by the first and second fields, outputting the frame, and then producing a second V-sync signal and a second H-sync signal. The output synchronizing processor is used to compensate for the second V-sync signal on a border between two fields of the frame after the frequency multiplication according to the second H-sync signal, and then output the second V-sync signal and the second H-sync signal.

In another embodiment of the present invention, the frequency multiplication can be achieved by interpolation calculating or by duplicating the scan lines. The frame before the frequency multiplication includes an odd number of scan lines, and the frame after the frequency multiplication also includes an odd number of scan lines.

In this embodiment, the first field is one of an odd field and an even field, and the second field is one of an odd field and an even field that is different from the first field. The input synchronizing processor also receives the first composite synchronous signal, and the first V-sync signal and the first H-sync signal are obtained by demodulating the first composite synchronous signal. The output synchronizing processor modulates the second V-sync signal and the second H-sync signal to produce a second composite synchronous signal, and then output the second composite synchronous signal.

In this embodiment, the apparatus for the interlace scan video signal frequency multiplication further comprises an analog-to-digital converter (ADC) and a scan line buffer. The ADC converts the interlace scan video signal to a digital signal from an analog signal, and then provides the digital signal to the capture. The scan line buffer registers the data of at least one of the scan lines output by the capture for the frequency multiplier.

The present invention provides a method and an apparatus for the interlace scan video signal frequency multiplication. After the video signal is frequency multiplied by the frequency multiplier, the output can be of the same or different resolutions. As described in the following preferred embodiments, the present invention focuses on removing a part of a V-sync signal which is asynchronous with an H-sync signal (i.e. the border between two fields); performing a frequency multiplication on the video signal with a frame as a unit; and finally, compensating for the V-sync signal on a border between two fields. Therefore, only the scan line buffer is required, high cost for the conventional frame buffer architecture can be avoided; and since the frames after or before the frequency multiplication both include an odd number of scan lines, the problem that the output fields of the conventional scan line buffer architecture overlap with each other can be eliminated. Since the whole frame is taken as a unit for frequency multiplication calculation in the present invention, the current video processing apparatus for processing the non-interlace scan architecture can be used for the interlace scan signal in the present invention, and the output is still in the interlace scan mode, without sacrificing the image quality.

In order to make the aforementioned and other objects, features and advantages of the present invention comprehensible, preferred embodiments accompanied with figures are described in detail below.

DESCRIPTION OF EMBODIMENTS

Figure 1A:
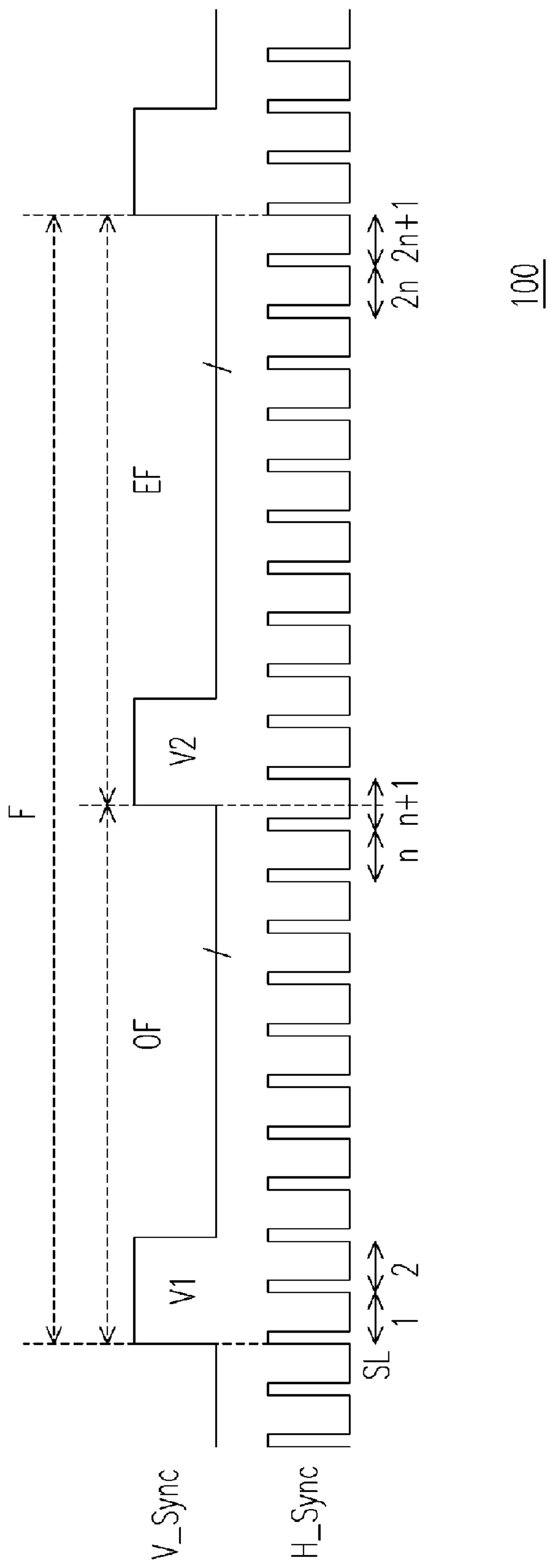
FIG. 1A is a timing diagram of the conventional interlace scan.
Figure 1B:
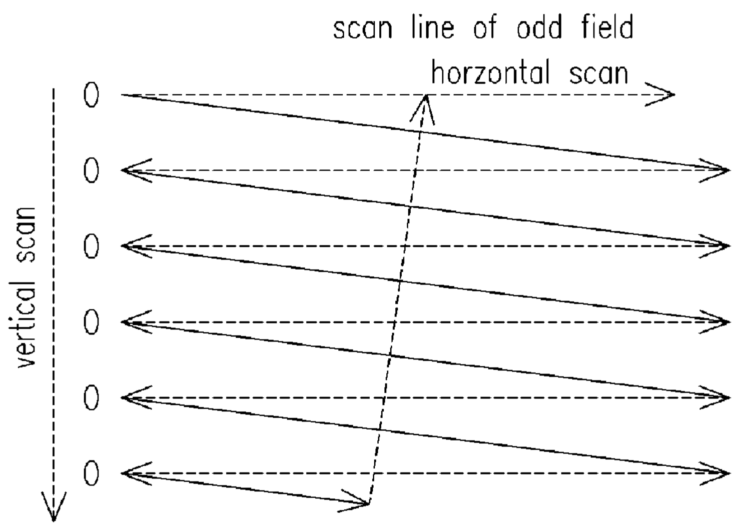
FIGS. 1B, 1C, and 1D are schematic views of the displaying modes for the conventional interlace scan.
Figure 1C:
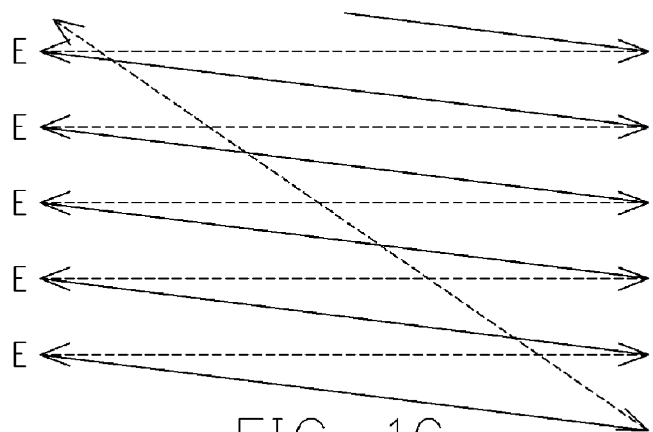
Figure 1D:
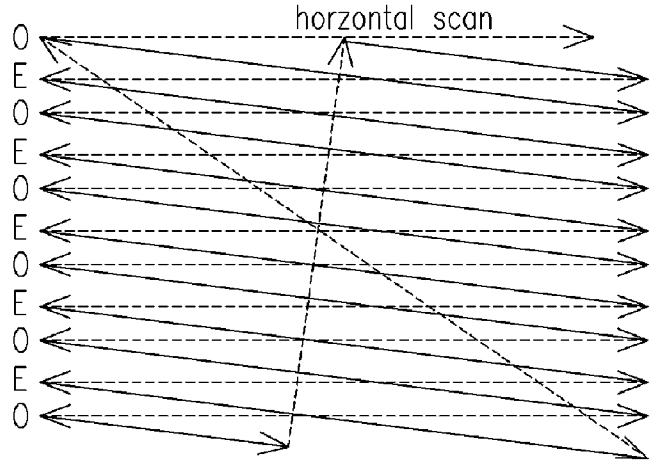
Figure 2:
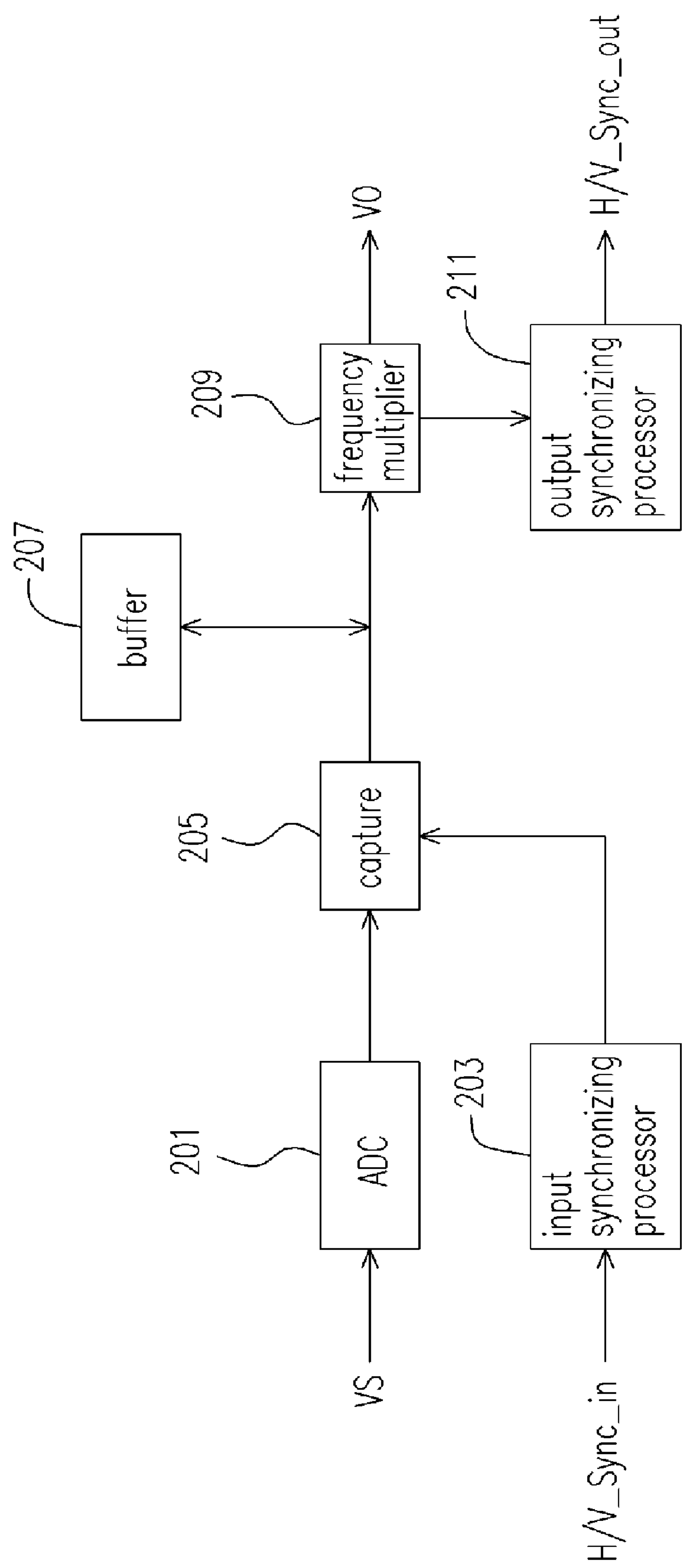
FIG. 2 is a block diagram of the conventional video processing apparatus of the display device.
Figure 3A:
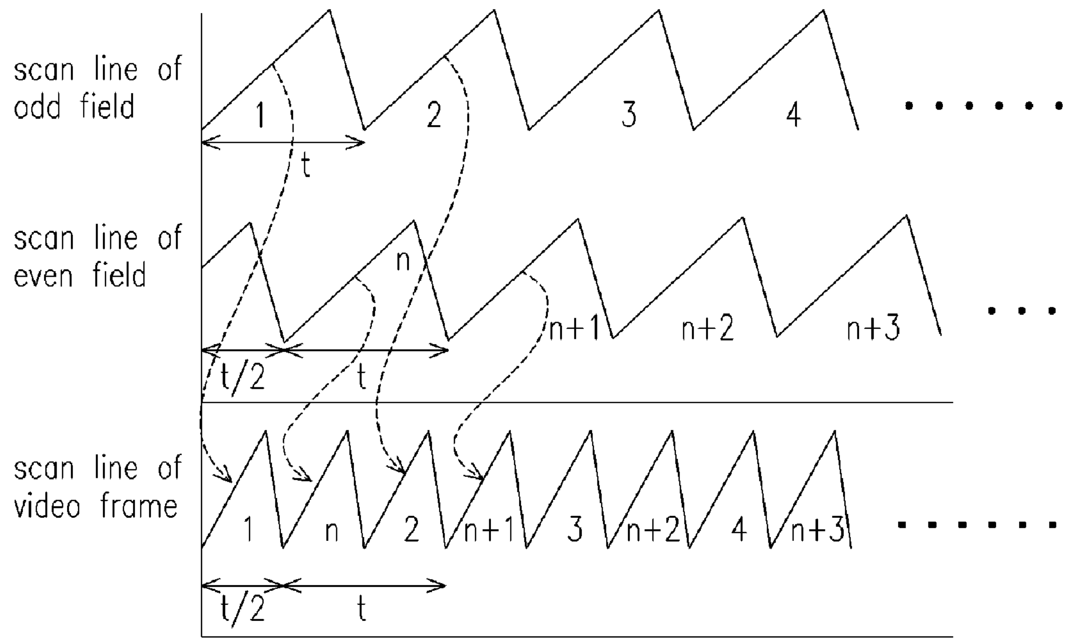
FIG. 3A is a schematic view of the conventional frequency multiplication method employing a frame buffer.
Figure 3B:
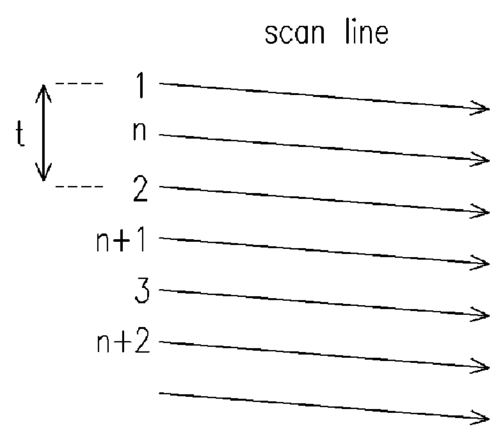
FIG. 3B is a schematic view of the displaying mode for the conventional non-interlace scan employing a frame buffer for frequency multiplication.
Figure 4A:
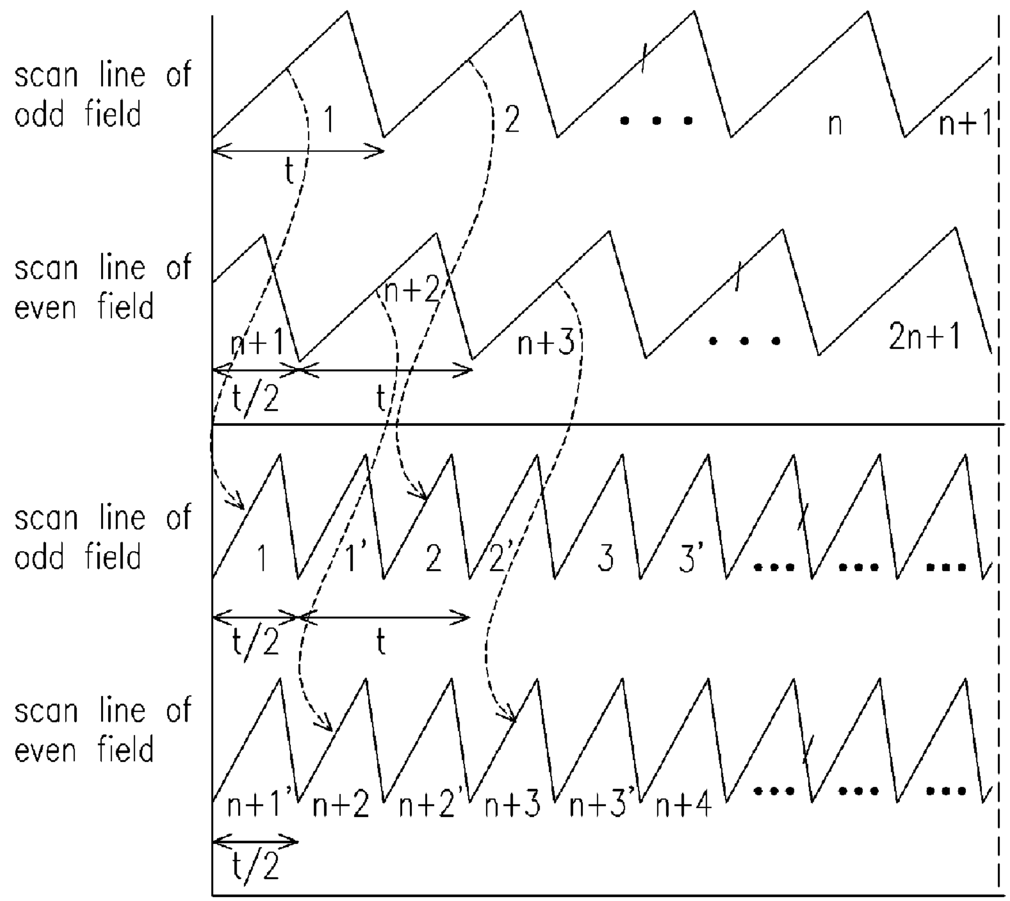
FIG. 4A is a schematic view of the conventional frequency multiplication method employing a scan line buffer.
Figure 4B:
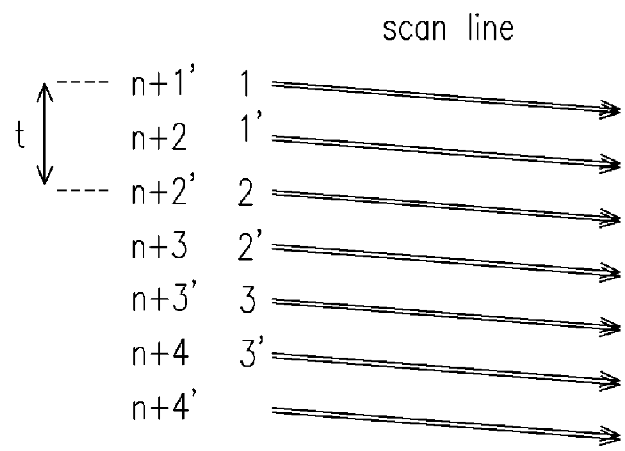
FIG. 4B is a schematic view of the displaying mode for the conventional interlace scan employing a scan line buffer.
Figure 5:
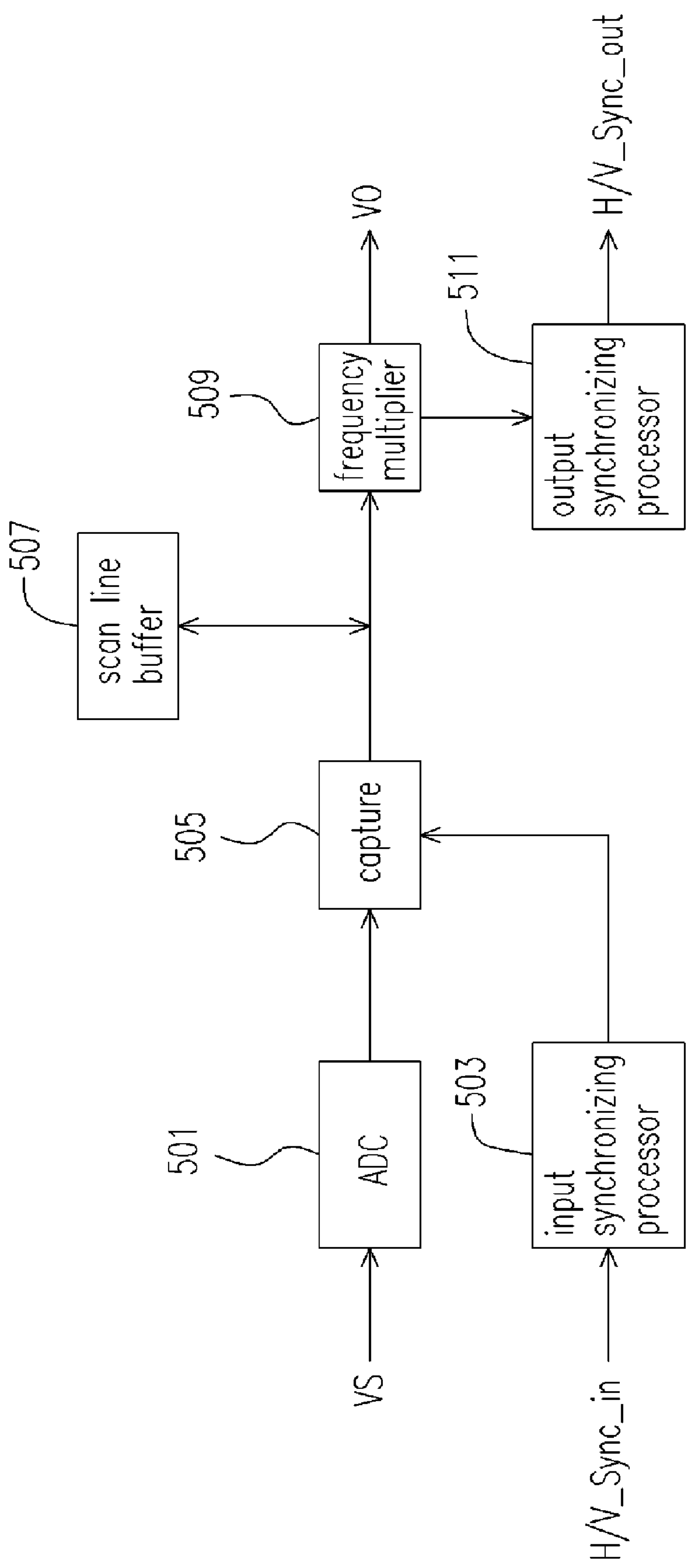
FIG. 5 is a block diagram of the apparatus for the interlace scan video signal frequency multiplication according to a preferred embodiment of the present invention.

FIG. 5 is a block diagram of the apparatus for interlace scan video signal frequency multiplication according to a preferred embodiment of the present invention. Referring to FIG. 5, the apparatus 500 for the interlace scan video signal frequency multiplication of the present invention includes an input synchronizing processor 503, a capture 505, a frequency multiplier 509, and an output synchronizing processor 511. In this embodiment, the apparatus 500 for the interlace scan video signal frequency multiplication further includes an analog-to-digital converter (ADC) 501 and a scan line buffer 507.

Figure 6:
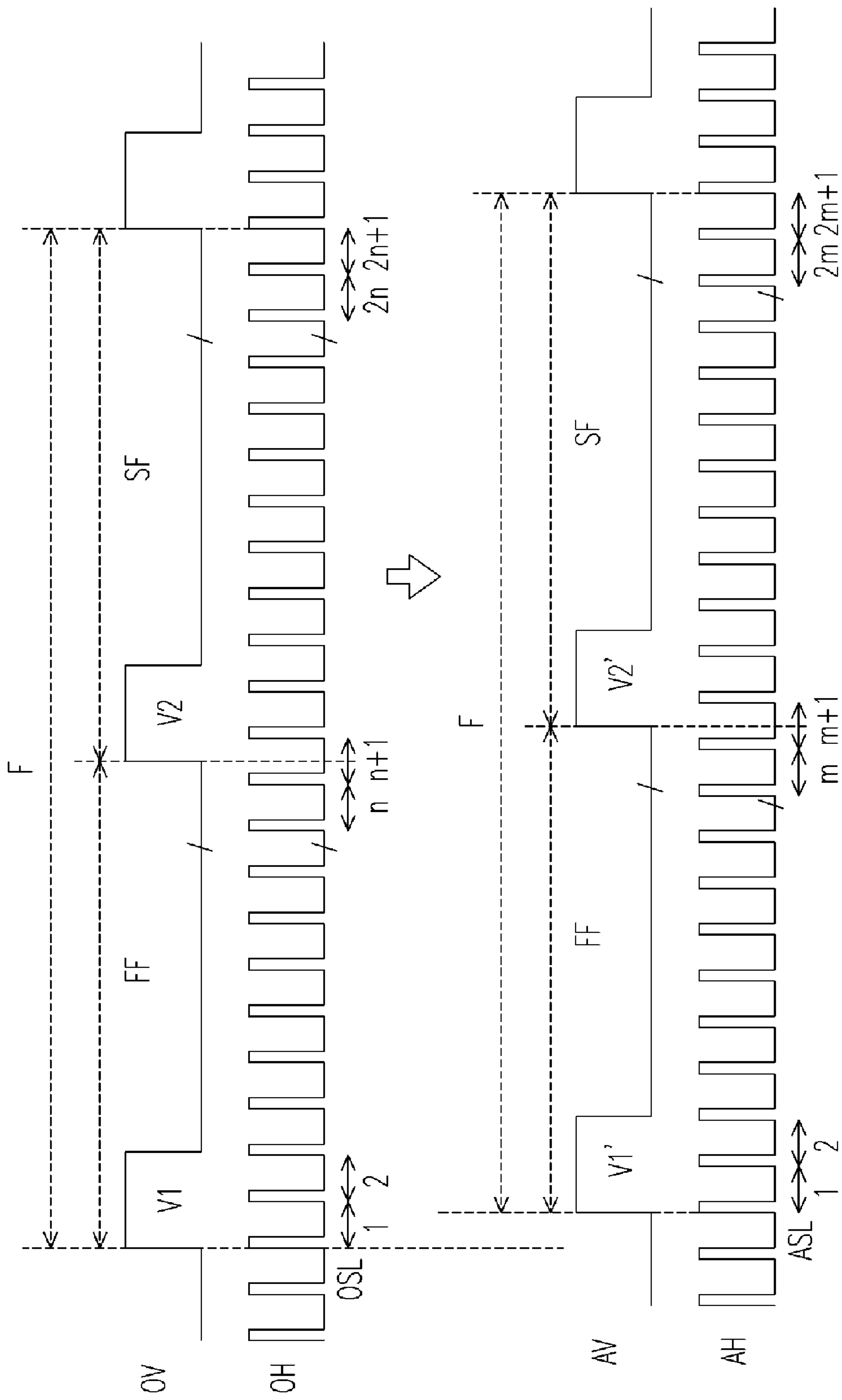
FIG. 6 is a scan timing diagram according to this embodiment.

FIG. 6 is a scan timing diagram according to this embodiment. Referring to FIGS. 5 and 6, in the scan timing diagram 600, a first V-sync signal OV, a first H-sync signal OH, a second V-sync signal AV, and a second H-sync signal AH are included. During the period of the first pulse V1 of the first V-sync signal OV, the video frame F of the input video signal VS is scanned for the odd number of scan lines according to the scan period of the first H-sync signal OH, and thereby the first field FF is produced. Similarly, during the period of the second pulse V2 of the first V-sync signal OV, the video frame F of the input video signal VS is scanned for even scan lines according to the scan period of the first H-sync signal OH, and thereby the second field SF is produced.

In this embodiment, the first field FF is an odd field OF, and the second field SF is an even field EF. In other embodiments of the present invention, the configuration of the fields can be exchanged, i.e., the first field FF is an even field EF, and the second field SF is an odd field OF.

The odd field OF has (n+0.5) scan lines OSL, and after being frequency multiplied by the frequency multiplier 509, it has (m+0.5) scan lines ASL. The even field EF has (n+0.5) scan lines OSL, and after being frequency multiplied by the frequency multiplier 509, it has (m+0.5) scan lines ASL. Thus, it can be known that one video frame F before the frequency multiplication has (2n+1) scan lines OSL, and it will include (2m+1) scan lines ASL after being frequency multiplied by the frequency multiplier 509. There is a multiple relationship between the number of the scan lines ASL (i.e., 2m+1) output by the frequency multiplier 509 after the frequency multiplication and that of the scan lines OSL (i.e., 2n+1) before the frequency multiplication. The magnitude is not limited to be an integer, and 0.5 or 1.5, etc. are also possible values.

In this embodiment, the ADC 501 is used for receiving the video signal VS, converting the video signal VS to a digital signal from an analog signal, and then providing the digital signal to the capture 505. The input synchronizing processor 503 is used for receiving the first composite synchronous signal H/V_Sync_in, demodulating the first composite synchronous signal H/V_Sync_in to produce the first V-sync signal OV and the first H-sync signal OH, and then removing a part (V2) of the first V-sync signal OV which is asynchronous with the first H-sync signal OH.

In this embodiment, the video signal VS can be an interlace scan video signal. Instead of being limited to receive the first composite synchronous signal H/V_Sync_in, the input synchronizing processor 503 is only required to separately receive and transfer the first V-sync signal OV and the first H-sync signal OH to the capture 505. Thus, the capture 505 can capture the range for the digital signal to be processed according to the first V-sync signal OV and the first H-sync signal OH. Thus, the modulating and demodulating processes can be omitted.

Then, according to the first V-sync signal OV with the asynchronous part having already been removed output from the input synchronizing processor 503, the capture 505 captures the first field FF and the second field SF from the interlace scan video signal VS, and then outputs the first field FF and the second field SF. The scan line buffer 507 is used to register the data of at least one of the scan lines for the first field FF and the second field SF output by the capture 505 for the frequency multiplier 509. Finally, the frequency multiplier 509 performs the frequency multiplication on the video frame F made up by the first field FF and the second field SF, outputs the digital signal VO as the interlace scan signal, and produces and outputs the second V-sync signal AV and the second H-sync signal AH to the output synchronizing processor 511.

According to the second H-sync signal AH, the output synchronizing processor 511 compensates for the second V-sync signal AV on a border between two fields (i.e., V2') of the video frame F after the frequency multiplication. Then, the second V-sync signal AV and the second H-sync signal AH are modulated to produce a second composite synchronous signal H/V_Sync_out. After that, the digital signal VO and the second composite synchronous signal H/V_Sync_out are transferred to the back-end circuit of the display device for further processing.

In this embodiment, instead of being limited to outputting the second composite synchronous signal H/V_Sync_out, the output synchronizing processor 511 is only required to separately transfer the second V-sync signal AV and the second H-sync signal AH to the back-end circuit of the display device for further processing. Thus, the modulating and demodulating processes can also be omitted.

Figure 7:
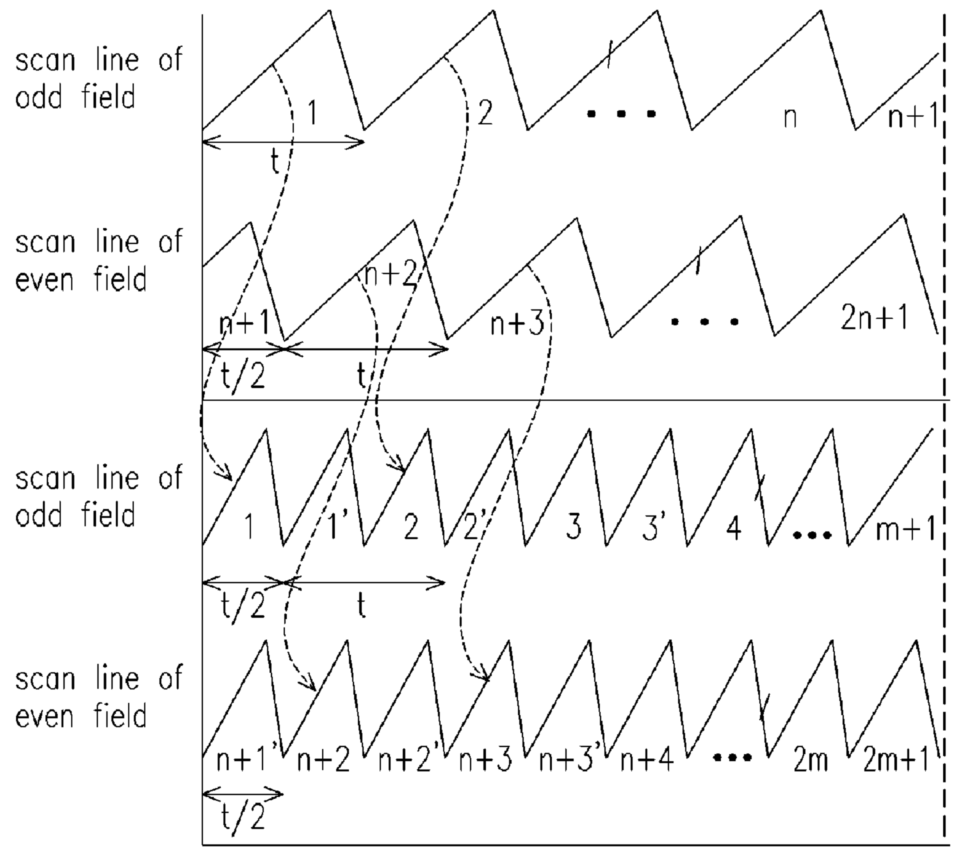
FIG. 7 is a schematic view of the scanning mode according to this embodiment.
Figure 8:
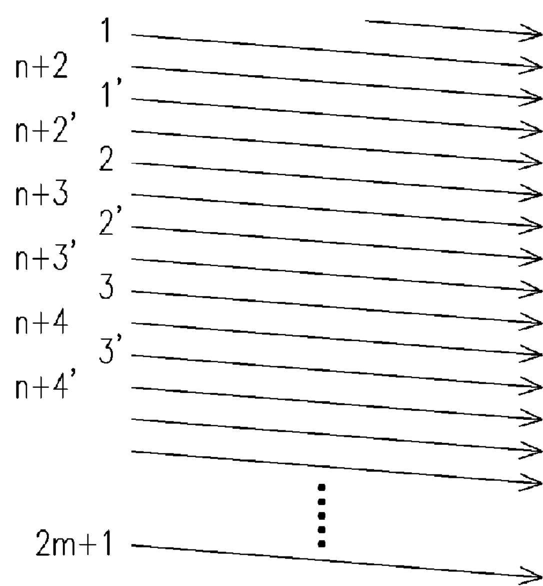
FIG. 8 is a schematic view of the displaying mode according to this embodiment.

FIG. 7 is a schematic view of the scanning mode of this embodiment. Referring to FIGS. 5 and 7, the video frame F is taken as a processing unit in the apparatus 500 for the interlace scan video signal frequency multiplication in this embodiment. Therefore, in the scan period t of the first H-sync signal OH provided by the input synchronizing processor 503, the frequency multiplier 509 performs a frequency multiplication process on the scan lines OSL of the odd field OF and that of the even field EF stored in the scan line buffer 507, so that in the same scan period t of the first H-sync signal OH, the frequency multiplication relationship between the scan lines ASL of the odd field OF and that of the even field EF can be achieved, and then they are output. The magnitude is not limited to be an integer, and 0.5 or 1.5, etc. is also available. FIG. 8 is a schematic view of the displaying mode of this embodiment. Referring to FIGS. 5 and 8, in the apparatus 500 for the interlace scan video signal frequency multiplication, the original (2n+1) scan lines OSL of the video frame F can be increased to (2m+1) scan lines ASL after the video frame F is frequency multiplied by the frequency multiplier 509; and then, the video frame F is output as the interlace scan signal. Thus, unlike the conventional frequency multiplication process with two fields being overlapped with each other, the displayed image quality is improved.

In this embodiment, the frequency multiplication process can be achieved by the interpolation calculation or by duplicating the scan lines. The video frame F includes an odd number of scan lines OSL before the frequency multiplication, and it also includes an odd number of scan lines ASL after the frequency multiplication.

Figure 9:
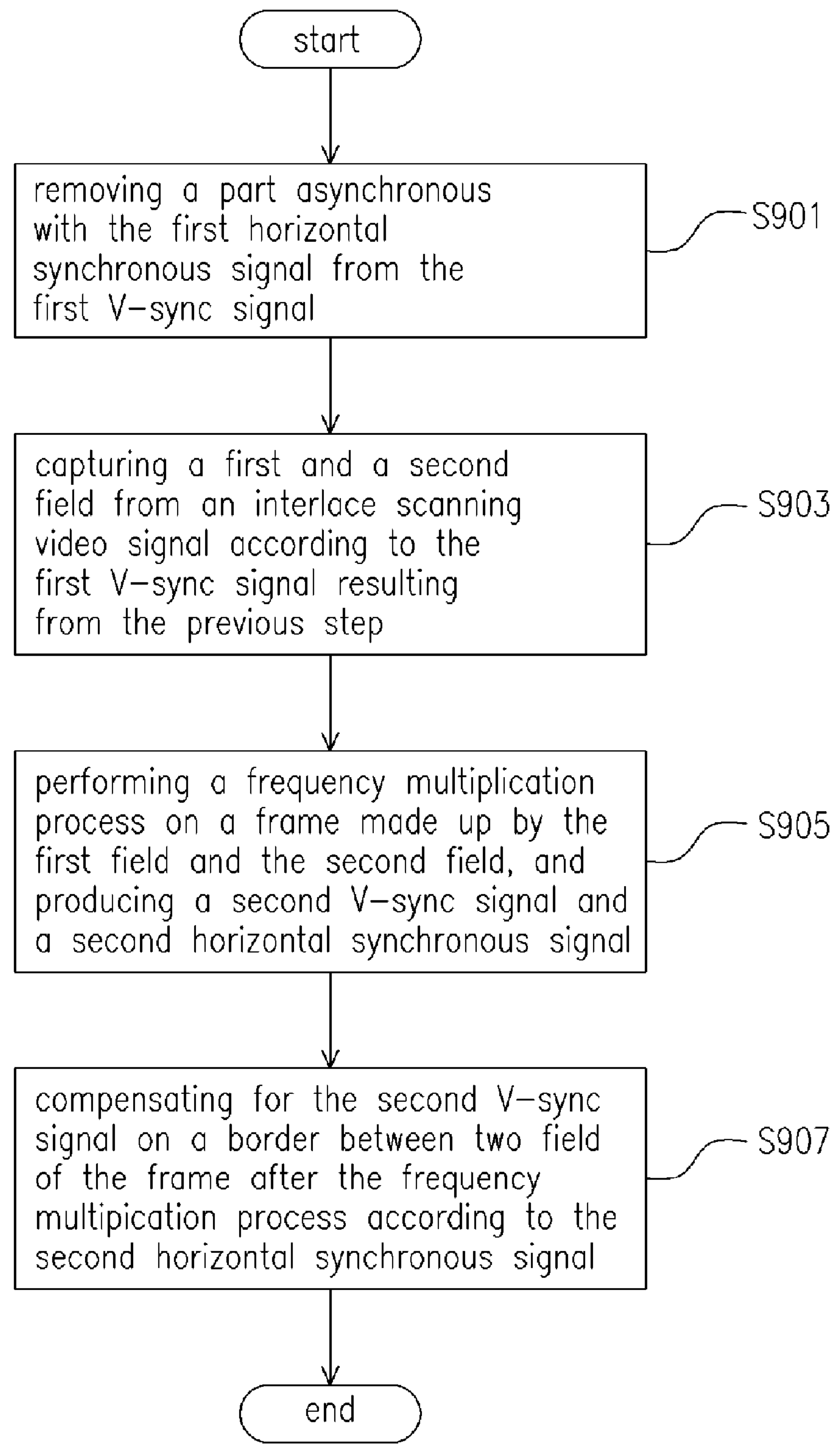
FIG. 9 is a flow chart of the method for the interlace scan video signal frequency multiplication according to a preferred embodiment of the present invention.

FIG. 9 is a flow chart of the method for the interlace scan video signal frequency multiplication according to a preferred embodiment of the present invention. Firstly, as described in Step S901, a part of the first V-sync signal which is asynchronous with the first H-sync signal is removed. And, in Step S903, according to the first V-sync signal obtained from the previous step, a first field and a second field are captured from an interlace scan video signal. Subsequently, in Step S905, a frequency multiplication process is performed on a frame made up by the first and second fields, and then, a second V-sync signal and a second H-sync signal are produced. Finally, in Step S907, according to the second H-sync signal, the second V-sync signal on a border between two fields of the frame after the frequency multiplication process is compensated.

In view of the above, the present invention provides a method and an apparatus for interlace scan video signal frequency multiplication, which have the following advantages.

1. As an interlace scan architecture is employed without the frame buffer, the output can be of the same or different resolutions after being digitally processed.

2. As the scan line buffer is employed, and the video frame is taken as a processing unit, an interlace scan architecture is maintained after being digitally processed, such that the disadvantage of the conventional method that the fields overlap with each after frequency multiplication can be avoided; moreover, as the scan line buffer is employed, the manufacturing cost is reduced.

3. Since the frame is taken as a unit for the frequency multiplication process, the presently-existed video processing apparatus for processing the non-interlace scan architecture can be used for processing the interlace scan signal.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for interlace scanning video signal frequency multiplication, comprising:

receiving a first horizontal synchronous signal (H-sync signal);

receiving a first vertical synchronous signal (V-sync signal) having a first pulse and a second pulse in a frame, the second pulse being on a border between a first field and a second field of the frame;

removing the second pulse of the first V-sync signal;

capturing the first field and the second field from an interlace scan video signal according to the first V-sync signal obtained from the previous step;

performing a frequency multiplication on a frame made up by the first and second fields, and producing a second V-sync signal and a second H-sync signal; and compensating for the second V-sync signal on a border between two fields of the frame after the frequency multiplication according to the second H-sync signal.

2. The method for interlace scanning video signal frequency multiplication as claimed in claim 1, wherein the frequency multiplication is achieved by an interpolation calculation.

3. The method for interlace scanning video signal frequency multiplication as claimed in claim 1, wherein the frequency multiplication is achieved by duplicating scan lines.

4. The method for interlace scanning video signal frequency multiplication as claimed in claim 1, wherein the frame before the frequency multiplication includes an odd number of scan lines, and the frame after the frequency multiplication also includes an odd number of scan lines.

5. The method for interlace scanning video signal frequency multiplication as claimed in claim 1, wherein the first field is one of an odd field and an even field, and the second field is one of an odd field and an even field that is different from the first field.

6. An apparatus for interlace scanning video signal frequency multiplication, the apparatus receiving a first horizontal synchronous signal (H-sync signal) and a first vertical synchronous signal (V-sync signal) having a first pulse and a second pulse in a frame, the second pulse being on a border between a first field and a second field of the frame, comprising:

an input synchronizing processor, for removing the second pulse of the first V-sync signal, and outputting a processed first V-sync signal;

a capture, for capturing the first field and the second field from an interlace scan video signal according to the processed first V-sync signal, and then outputting the first and second fields;

a frequency multiplier, for performing a frequency multiplication on a frame made up by the first and second fields, outputting the frame, and producing a second V-sync signal and a second H-sync signal; and an output synchronizing processor, for compensating for the second V-sync signal on a border between two fields of the frame after the frequency multiplication according to the second H-sync signal, and then outputting the second V-sync signal and the second H-sync signal.

7. The apparatus for interlace scanning video signal frequency multiplication as claimed in claim 6, wherein the frequency multiplier performs the frequency multiplication by the interpolation calculation.

8. The apparatus for interlace scanning video signal frequency multiplication as claimed in claim 6, wherein the frequency multiplier performs the frequency multiplication by duplicating scan lines.

9. The apparatus for interlace scanning video signal frequency multiplication as claimed in claim 6, wherein the frame before the frequency multiplication includes an odd number of scan lines, and the frame after the frequency multiplication also includes an odd number of scan lines.

10. The apparatus for interlace scanning video signal frequency multiplication as claimed in claim 6, wherein the first field is one of an odd field and an even field, and the second field is one of an odd field and an even field that is different from the first field.

11. The apparatus for interlace scanning video signal frequency multiplication as claimed in claim 6, wherein the input synchronizing processor also receives a first composite synchronous signal, and the first V-sync signal and the first H-sync signal are obtained by demodulating the first composite synchronous signal.

12. The apparatus for interlace scanning video signal frequency multiplication as claimed in claim 6, wherein the output synchronizing processor modulates the second V-sync signal and the second H-sync signal to produce a second composite synchronous signal, and then outputs the second composite synchronous signal.

13. The apparatus for interlace scanning video signal frequency multiplication as claimed in claim 6, further comprising:

an analog-to-digital converter (ADC), for converting the interlace scan video signal to a digital signal from an analog signal, and then providing the digital signal to the capture.

14. The apparatus for interlace scanning video signal frequency multiplication as claimed in claim 6, further comprising:

a scan line buffer, for registering the data of at least one of the scan lines output by the capture for the frequency multiplier.

* * * * *